March 22, 1960

R. D. COLINET 2,929,255

VARIABLE SPEED TRANSMISSION

Filed Sept. 6, 1955

INVENTOR
Rene D. Colinet
BY
ATTORNEYS.

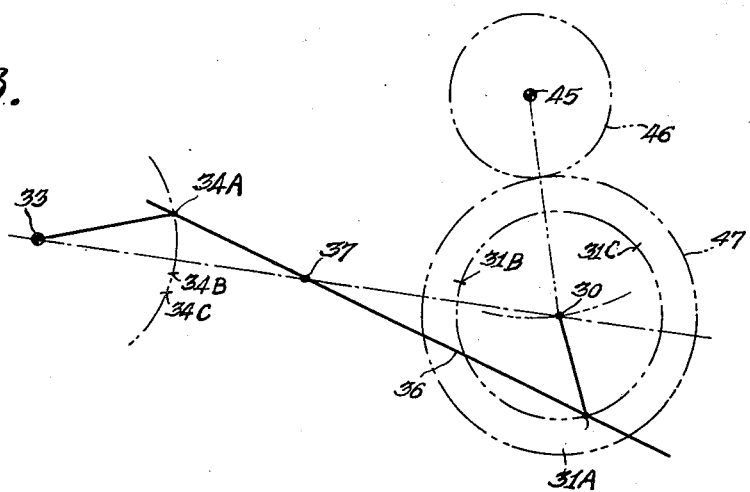
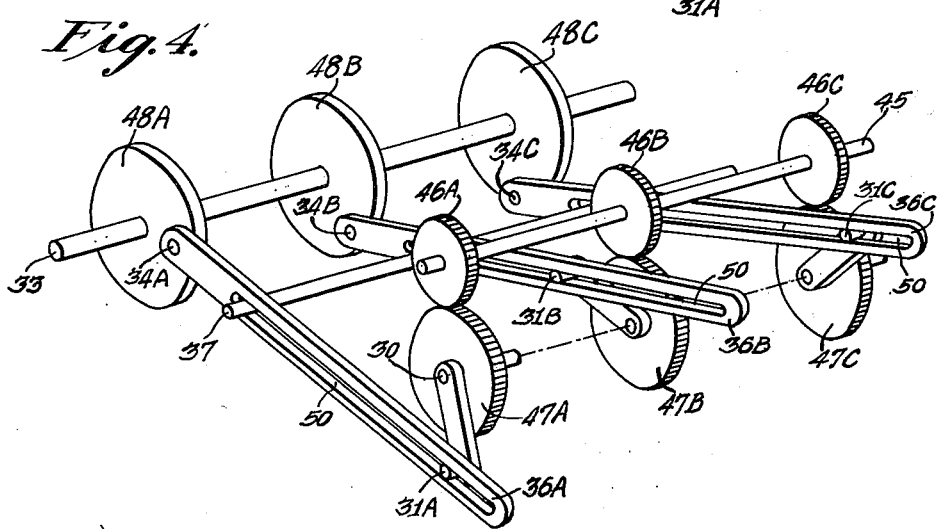
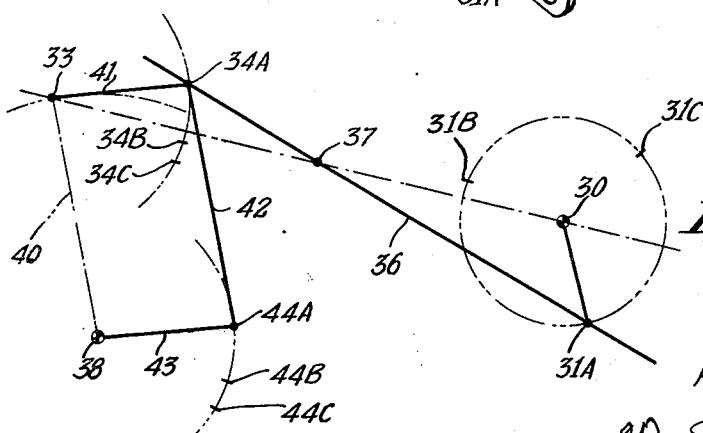

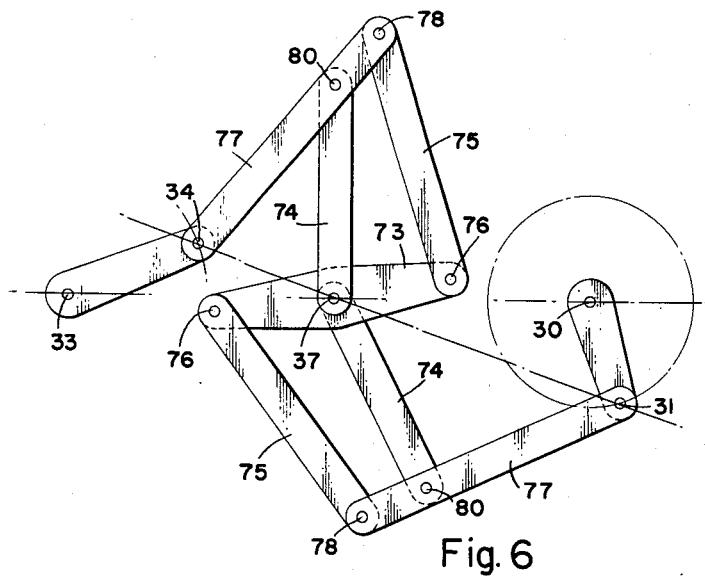
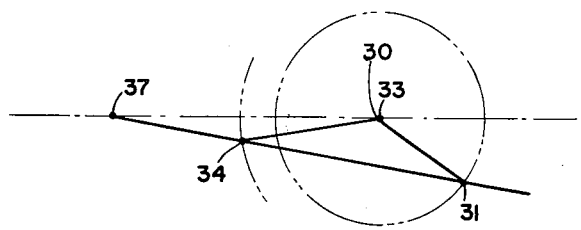
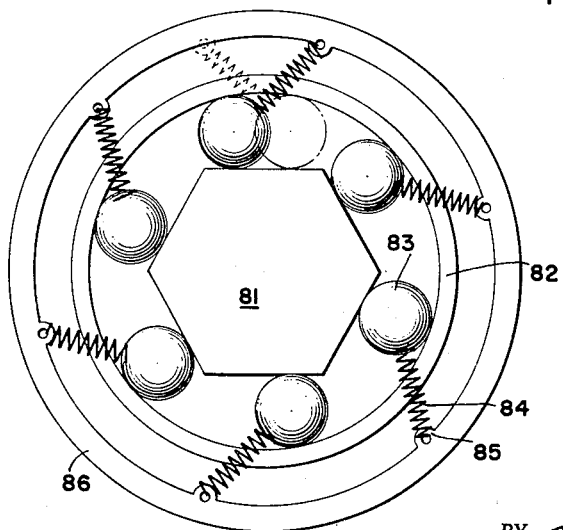

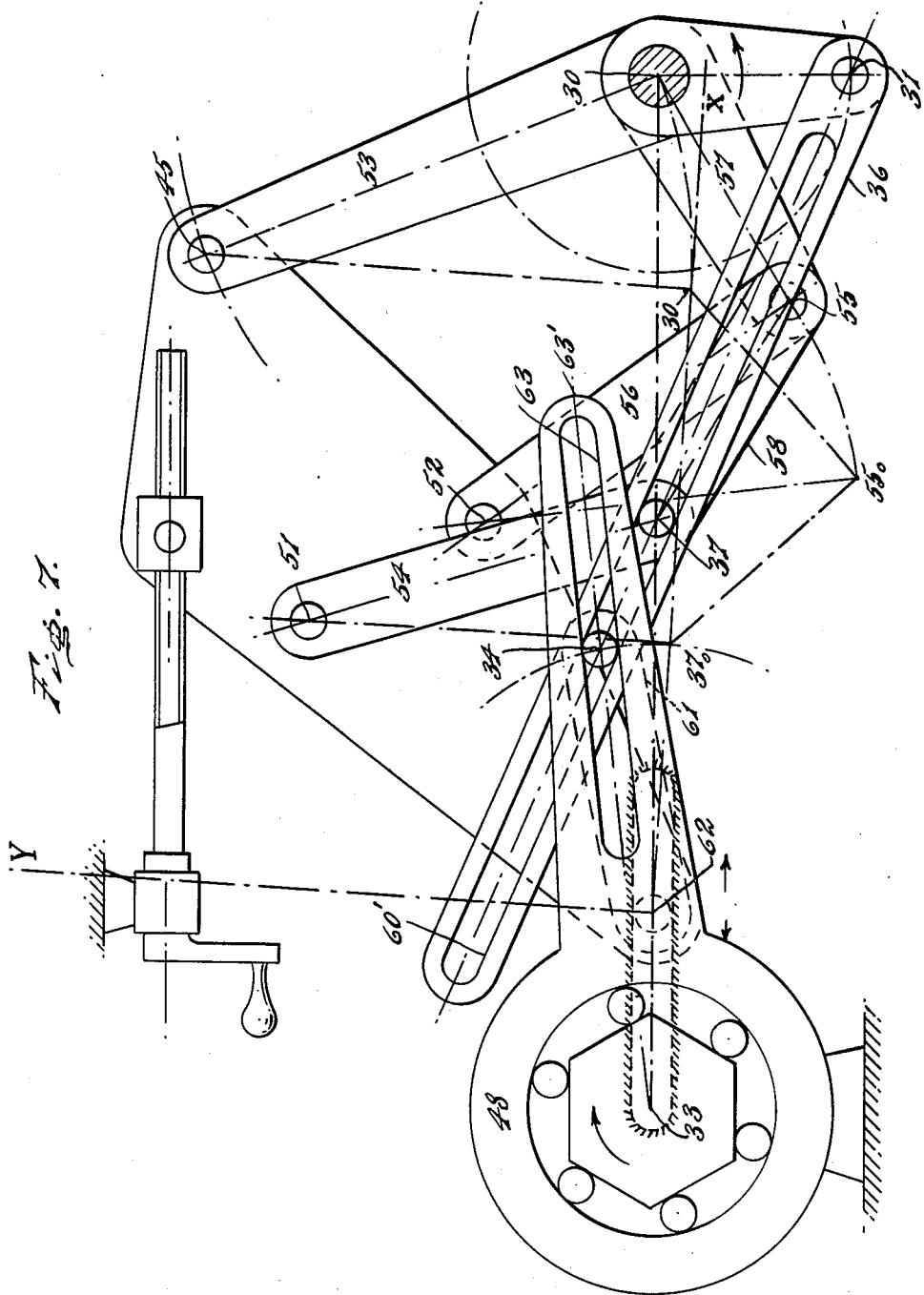

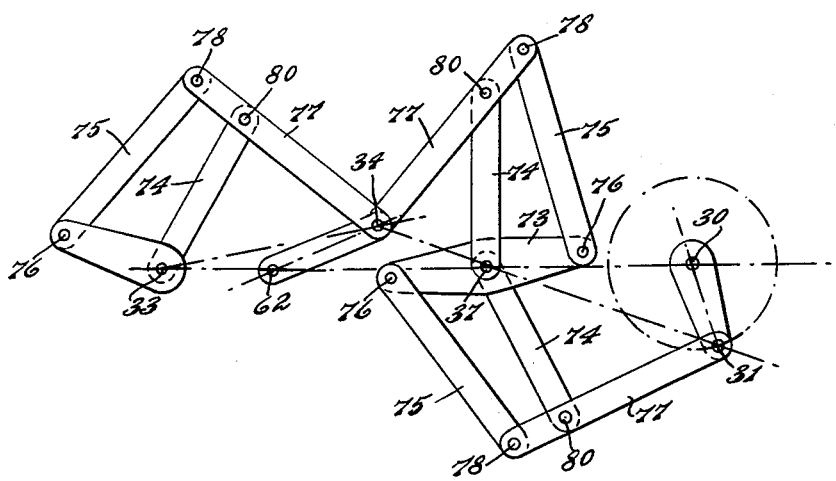

United States Patent Office 2,929,255
Patented Mar. 22, 1960

2,929,255

VARIABLE SPEED TRANSMISSION

Rene D. Colinet, Philadelphia, Pa., assignor to La Soudure Electrique Autogene, S.A., Brussels, Belgium, a corporation of Belgium Application September 6, 1955, Serial No. 532,425

5 Claims. (Cl. 74—119)

The present invention concerns variable speed transmissions and speed reduction mechanism, particularly of the character which are capable of changing one constant angular speed into another constant angular speed without resorting to rolling adherence or rolling friction, permitting adjustment of the ratio of the second speed to the first speed at will to any value over the range between zero and a maximum.

The invention is concerned with positive infinitely variable mechanical power transmissions of the type in which oscillating, arcuate or reciprocating motions are superimposed and combined to create a continuous motion. One such device, referred to by way of example, is illustrated by Robin and Van Roggen U.S. Patent 2,162,124, granted June 13, 1939 for Change-speed Device. In transmissions of this character, it has been necessary in the prior art to combine a minimum of four arcuate or reciprocating motions, dephased 90° to one another in order to create a substantially uniform rotation.

A purpose of the present invention is to reduce the number of components to three, each of which is dephased 120°, and accordingly to simplify the construction and design of the mechanism, reduce the initial cost and lower the cost of maintenance.

A further purpose is to obtain complete symmetry within each of the component mechanisms with respect to a central or midposition of that mechanism.

A further purpose is to permit ready reversal of the direction of motion, without requiring additional reversing mechanism to convert one rotation into another in the opposite direction.

A further purpose is to construct the device from an input crank rotatable around a first axis, a lever operatively connected to the input crank and pivoting around a second point or axis removed from the first axis and parallel thereto, a radius of the lever aligning with the pin of the input crank for at least one-third of each revolution of the input crank, and an output crank operatively connected to the lever and oscillating around a third axis, removed from the second axis and parallel thereto, a radius of the lever aligning with the pin of the output crank; the second point or axis, the third axis and the second pin being aligned with one another when the first axis, the second point or axis and the first pin are aligned with one another; the ratio of the distance between the first axis and the second point or axis to the distance between the first axis and the first pin being greater than the ratio of the distance between the second point or axis and the third axis to the distance between the third axis and the second pin; the first derivative of the function expressing the angular motion of the output crank in terms of rotation of the input crank being of equal value in two positions, the first position being located where the first pin is lined up with the first axis and second point or axis, while the first axis lies between the first pin and the second point or axis, the second position being located where the first pin has rotated substantially 60° from the first position in either direction; whereby equal increments of motion of the first pin at the first position and at the second position will produce motions of the second pin having equal amplitude.

In the drawings I have chosen to illustrate a few only of the numerous embodiments in which my invention may appear, selecting the forms shown from the standpoints of convenience in illustration, satisfactory operation and clear demonstration of the principles involved.

Figure 2 is a diagrammatic view of a variant form of the device showing three mechanisms associated together.

Figure 3 is a diagrammatic view of a further variation of a speed variator in accordance with the invention.

Figure 4 is a fragmentary partially diagrammatic perspective showing the device of Figure 3.

Figure 5 is a diagrammatic view illustrating the basic linkage with the input and output shafts coaxial.

Figure 6 shows in elevation pivotally interconnected linkages without sliding pivots, useful in connection with the invention.

Figure 7 is a modified version of Figure 1.

Figure 8 shows the mechanism of Figure 7 with slideless articulated linkages.

Figure 9 shows the mechanism of Figure 7 adapted for co-axial input and output shafts.

Figure 10 is a schematic view showing one form of unidirectional reversible free-wheeling device.

Figure 1:
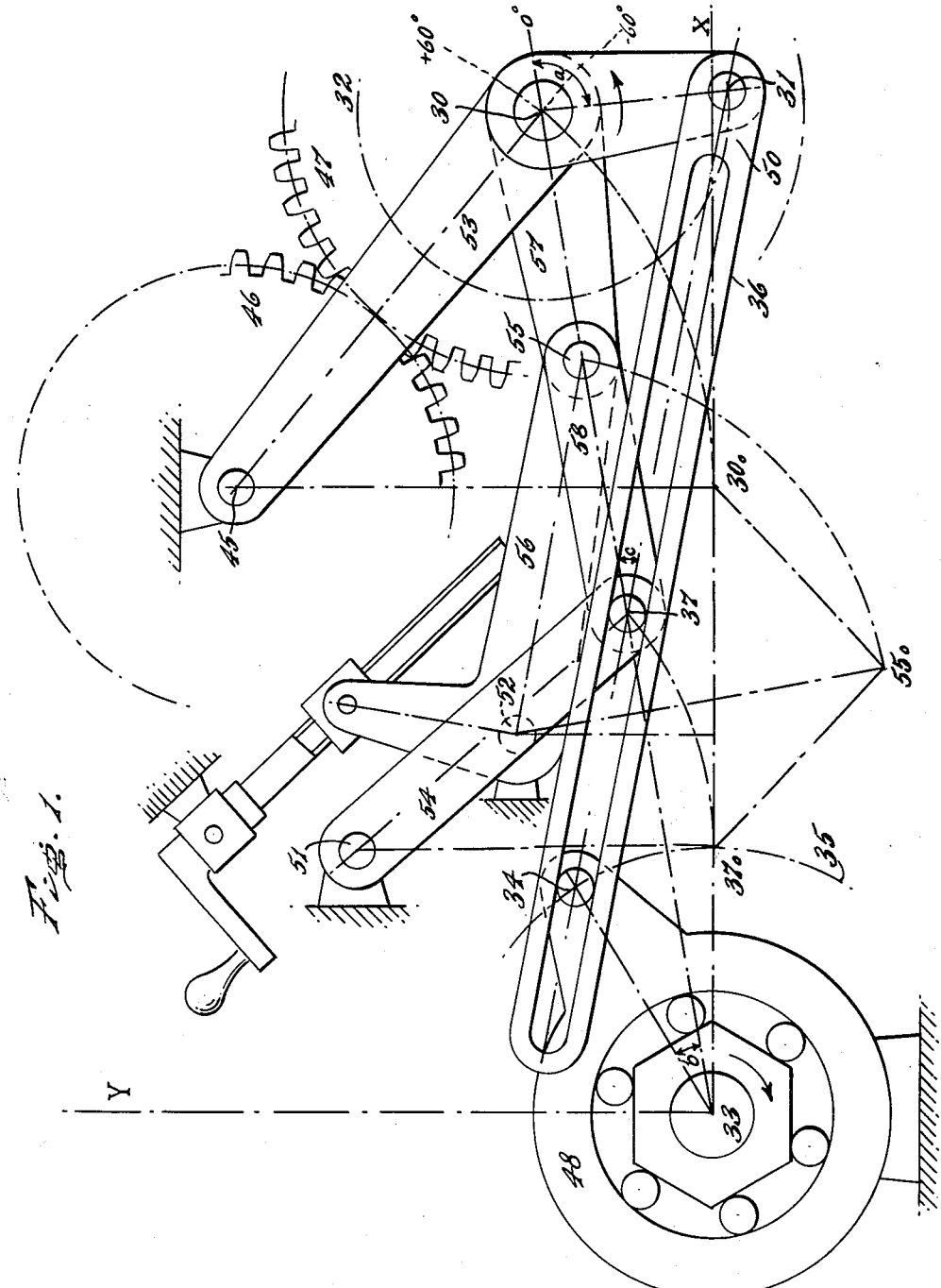
Figure 1 is a diagrammatic view of the basic linkage of one embodiment of the invention.

In the device of the invention, motion derived from the rotation of a first member, which may in particular embodiments be a crank, controls the motion of a second member, which may in a suitable embodiment be a lever or other suitable mechanism, so as to move the second member in order to impart to a third member an oscillating, arcuate or reciprocating motion which is uniform to a high degree over a certain portion of its range of angular motion. By imparting the uniform portion of the angular motion to an output shaft through free-wheeling devices from different mechanisms operating effectively at different angular positions in the motion of the input shaft, it is possible to create a continuous rotation of the output shaft which is quite uniform throughout the entire 360°. Thus to use a crude analogy, it may be considered that the output shaft is turned by a species of continuous uniform ratchet action, the forward motion being derived from each of the free-wheeling devices or ratcheting elements only when they are moving uniformly, and the free-wheeling devices being ineffective to advance the output shaft during periods of nonuniform or reverse motion.

Considering first the form of Figure 1, there is there shown an input axis or shaft 30 about which turns a crank 31 moving in a crank circle 32. An output axis or shaft 33 receives oscillatory motion by a crank 34 which moves over an arcuate path 35. While the path is a segment of a circumference, it will be evident as later explained that where a free-wheeling device connects the crank to the shaft at 33, the arcuate motion can be imparted by different mechanisms at different parts of the circumference of the input shaft rotation.

The cranks are interconnected by a suitable straight sliding member or lever 36 which is pivoted at 37 between its two ends, and suitably pivotally and slidably interconnected to the first crank pin 31 and the second crank pin 34.

The axes 30, 33 and 37 are on a straight line, which forms the axis of symmetry of the mechanism. The crank pin 31 follows the circular path 32 around the center 30 and is referred to as the input crank. The input crank will normally rotate at constant speed, such constant speed being convenient to analyze the mechanism. The second crank pin 34 follows an arcuate path about the center 33 between limits, and is referred to herein as the output crank.

The second member or lever 36 rotates around the axis 37 and slides as well as pivots with respect to one or both of the crank pins 31 and 34, so that the points 31, 37 and 34 are constantly aligned on a straight line. As the cranks rotate, the distances 31—37 and 37—34 will vary, while the distances 30—31, 30—37, 33—34, and 33—37 remain constant in value, but not in direction.

With constant rotation of the input crank 31 as assumed, if the ratio of the distance 30—37 to 30—31 is greater than the ratio of the distance 33—37 to 33—34, then the output crank pin 34 will oscillate above and below the axis 30—33.

The angle $c$ between the line 31—37 and the line 37—30 can be expressed as a function of the angle $a$ between the line 37—30 extended and the line 30—31 by the relation $$\tan c = \frac{\sin a}{m + \cos a} \quad (1)$$

where $$m = \frac{37-30}{30-31}$$

In turn, the angle $b$ between the line 37—33 and the line 33—34 can be expressed as a function of the angle $c$ by the relation $$\sin b = \frac{n - \sqrt{1-(n^2-1)\tan^2 c}}{\frac{1}{\tan c} + \tan c} \quad (2)$$

where $$n = \frac{33-37}{33-34}$$

With a proper choice of the ratios $m$ and $n$, the angular speed of the output crank pin 34 can be made practically constant when the input crank pin 31 rotates within a 120° sector defined by the angle $a$ which varies between minus 60° and plus 60°, or between plus 60° and minus 60°.

When the ratios $m$ and $n$ are so chosen that the angular speed of the output crank pin 34 in the position corresponding to either end of this sector equals the angular speed of the output crank 34 in the central position which corresponds to angle $a$ equals zero, then the angular speed of the output crank 34 remains very nearly constant over the entire range of positions of the input crank 31 within the 120° sector just defined.

There is an infinite variety of such choices in which either $m$ or $n$ can be arbitrarily assigned a particular value, provided that $n$ and $m$ then satisfy the following equation $$\frac{n-1}{m+1} = \frac{\cos(a-c)}{\cos(b+c)}\sqrt{\frac{n^2+1-2n\cos b}{m^2+1+2m\cos a}} \quad (3)$$

where the angles $a$, $b$ and $c$ are given values corresponding to their value at either end of the previously defined sector as follows:

$a = 60°$
$b = $ a value determined from Equation 2
$c = $ a value determined from Equation 1

Substituting these values for the angles, Equation 3 can be rewritten in the following form:

$$\frac{n-1}{m+1} = \frac{\cos c + \sqrt{3}\sin c}{2\cos(b+c)}\sqrt{\frac{n^2+1-2n\cos b}{m^2+m+1}} \quad (4)$$

Equation 3 expresses the condition that the angular speed of the output crank is the same at the two ends as in the middle in any sector which is equally divided by the axis 33—30. Equation 4 expresses the same property for a 120° sector as previously defined.

In equation 4 the angles $b$ and $c$ are determined from the following equations $$\tan c = \frac{\sqrt{3}}{2m+1} \quad (5)$$

$$\sin(b+c) = n \sin c \quad (6)$$

Equation 4 can best be solved by giving to $m$ successive arbitrary values, by finding $c$ from Equation 5, then trying various values for $n$, with the corresponding values of $b$ found from Equation 6, until approximate solutions from Equations 4 are determined.

A true solution for $n$ can can then be found with any desired degree of accuracy by one or more interpolations between the near-solutions.

The following sets of values for $m$ and $n$ satisfy Equation 4 when $a$ equals 60°:

| $m$ degrees | 1.9 | 1.93 | 2.0 | 2.2 | 2.4 | 2.6265 |
|---|---|---|---|---|---|---|
| $n$ degrees | 1.0 | 1.1 | 1.2157 | 1.4342 | 1.6327 | 1.9569 |
| $b$ degrees | 0 | 2.05 | 4.34 | 8.21 | 11.23 | 16.01 |

Other sets of values might be obtained graphically or by interpolation between the above sets. For each of the selected sets, the constancy of speed of the output crank over the entire arcuate range under discussion can be estimated by expressing the angle $b$ as a function of successive values of the angle $a$ from zero to 60° or above, as determined by Equations 1 and 2. For instance, when $m=2.6265$ and $n=1.9569$, we find:

| Angle $a$ in deg. | Angle $b$ in deg. | Increments of angle $b$, in deg. | Error to average 2.001 in percent |
|---|---|---|---|
| 0 | 0 | | |
| 7.5 | 1.980 | 1.980 | −1.05 |
| 15 | 3.962 | 1.982 | −0.95 |
| 22.5 | 5.955 | 1.993 | −0.40 |
| 30 | 7.955 | 2.000 | −0.05 |
| 37.5 | 9.966 | 2.011 | +0.50 |
| 45 | 11.981 | 2.015 | +0.70 |
| 52.5 | 14.003 | 2.022 | +1.05 |
| 60 | 16.011 | 2.008 | +0.35 |
| 67.5 | 17.989 | 1.978 | |
| 75 | 19.895 | 1.906 | |

The maximum error of 1.05% shown above corresponds in kind and magnitude to the pulsation imparted to a chain by a sprocket having 22 teeth, due to the change of the pitch diameter every half tooth. Since 22-tooth sprockets are considered to be practically free from appreciable pulsation, it is evident that the performance of the mechanism of the invention is uniform within acceptable limits.

Since the speed of the output cranks decreases slowly after the angle $a$ passes the 60° point, another identical linkage dephased 120° after the first one, can take over at that point, due to the free-wheeling devices, with considerable smoothness, and at a still further advanced point of 120° still later, a third such mechanism is applied. Free-wheeling or one-way clutches of well known design act in unison on a single output shaft. Since, for each of the three units, the constant speed is also the highest, in sign, each free-wheeling device acts upon the common shaft precisely when it is rotating at constant speed and never when rotating slower in the same direction, and also never when rotating in the reverse direction. The free-wheeling devices can be connected to the speed changing mechanisms by cranks or other suitable means. The continuity of rotation of the output shaft is, therefore, assured for all times, operating at a speed defined as follows:

$$\text{output speed} = \text{input speed} \times \frac{\text{angle } b \text{ for } a=60}{60 \text{ degrees}}$$

Thus as an example, when $m=2.6265$ and $n=1.9569$, $b=16.01$ degrees and the output speed is 26.7% of the input speed. Higher ratios are possible, but are limited because of increasing danger of a toggling angle between the output crank 33—34 and the lever or slide 31—37—34. A safe limit for that angle is 132° which corresponds to the maximum ratio of 26.7%.

As described above, with fixed axes 30, 33 and 37, this mechanism would produce only one fixed ratio of speeds, depending upon the particular choice of values of $m$ and $n$ in Equation 4. Contrary to gear reducers, the speed ratio is not restricted to commensurable values or fractions between two numbers. For instance, using the device of the invention, a ratio of $$\frac{1}{2\pi}$$

may be obtained, and this would be useful in digit computers and other calculating machines, despite the fact that $\pi$ is incommensurable. It is believed, however, that the chief application of the present invention will be in variable speed transmissions, in which a ratio of speed can be set up rapidly to any desired value between zero and a maximum. This requires changing $m$ and $n$ simultaneously according to Equation 4.

Several different classes of mechanisms may be employed to achieve this result, the following being examples:

(1) The axes 30, 33 and 37 remain fixed but the radii 30—31 and 33—34 are made changeable at will. The feature of having fixed positions for input and output shafts is desirable from a practical standpoint, but changing of the lengths of the cranks while they rotate or oscillate as the case may be involves serious technical complications.

(2) The crank lengths 30—31 and 33—34 remain constant but the center distances 30—37 and 37—33 can be changed at will. In a structural embodiment of this construction, one shaft can remain stationary in space. but the other shaft and the point or axis 37 must move to satisfy Equation 4.

(3) Both shafts remain fixed in space, but axis 37 is movable, with the input crank arm constant in length, and the output crank arm changeable in length. Due to the limited angular displacement of the output crank, the technical difficulty in changing its length is not as serious as for the fully rotating input crank.

The best solution from a practical standpoint will in many cases be that described in paragraph 2 above, provided that the input shaft remains fixed in space and the movable driven shaft transmits its angular oscillations by a parallelogram of levers pivotally connected and connected to an auxiliary output shaft fixed in space, and used as an external drive.

Figure 2 shows a device of this kind, in which axes 30 and 38 are fixed in space, with axis 33 moving along a circular path around axis 38, while point or axis 37 remains aligned with axes 30 and 33, and with the additional requirement that the mechanism satisfy Equation 4. The parallelogram in this case consists of levers 40, 41, 42 and 43 pivotally connected at their intersecting ends as shown. As in the case of the structure of Figure 1, this structure is repeated three times at 120° intervals, which are indicated by the crank pins 34A, 34B and 34C. Three free-wheeling devices indicated by 44A, 44B and 44C are mounted so as to apply rotational action to the output shaft 33, and these devices receive their oscillating motion by crank action from output crank pins 33—34 by means of the parallelogram, including the lever 44—34 which equals in length the radius 38—33.

It will, of course, be understood that there are correspondingly three levers 36, only one of which is shown in order to simplify the illustration.

There are numerous other solutions of the problem, one of which is shown in Figure 3. In this case the input shaft 30 is swingable or movable around an auxiliary shaft 45 fixed in space, and the input shaft is driven by gear 46 on shaft 45 driving gear 47 on shaft 30. The input shaft 30 can be a three-pin crank shaft, in which case only one set of gears 46, 47 need be employed. If preferred, separate stub shafts 30 may be used with a set of gears 46, 47 for each stub shaft. A practical embodiment of this form of Figure 3 is illustrated in Figure 4. As illustrated it will be evident that the levers 36A, 36B and 36C are pivotally connected by the output crank pins 34A, 34B and 34C to free-wheeling devices 48A, 48B and 48C, each of which transmits rotation in the same direction at a different part of the arctuate path of rotation to common output shaft 33. The levers 36A, 36B and 36C are slotted at 50, making slidable pivotal connections respectively to the input crank pins 31A, 31B and 31C, and also to the point or axis controlling element 37. The point or axis 37 can be shifted in either direction, bringing about appropriate shifts in the sliding pivot to the input crank pins.

Here again, the point or axis 37 remains aligned with the axis 30 and axis 33, and at proper relative distance to them as defined by Equation 4. The required conditions can be secured by known means such as cam guides, or convenient placement of articulated levers. In Figure 1 the axes 33, 45, 51 and 52 are the only axes or pivots fixed in space. The axis 30 rotates on a suitable arm 53 around the pivot 45. The point or axis 37 rotates around the pivot 51 by a suitable arm 54. The connection 55 rotates around the pivot 52 by a suitable arm 56. The axis 30 is pivotally connected to the connection 55 by a rod 57 and the point or axis 37 is pivotally connected to the connection 55 by a rod 58. Two extreme positions are shown indicated respectively by the points or axes 37, 37₀; 30, 30₀; 55, 55₀.

The respective positions and lengths of these various elements in space according to the X and Y coordinates are illustrated in the table below, it being evident, however, that the figures given are basic, and that they can be multiplied by any common factor to change the scale.

| Ref. No. | $x$ | $y$ | length |
|---|---|---|---|
| 33 | 0 | 0 | |
| 45 | 131 | 102 | |
| 51 | 55 | 76 | |
| 52 | 79 | 41.5 | |
| 53 | | | 102 |
| 54 | | | 76 |
| 56 | | | 79 |
| 57 | | | 53 |
| 58 | | | 53 |

Positions 30₀ (0;131) and 37₀ (0;55) correspond to $n=1$ (that is, no motion of the output crank), which means that the length of the output crank 33—34 of Figure 1 is equal to 55 coordinate units. Control of the speed ratios is effected by rotating the arm 56 and setting it at the desired position. The same speed changing linkage is also applicable to Figure 2 or any other form of the device where the crank lengths are constant, and it will be understood that such design will be applicable without separately illustrating the adjusting mechanism applied to each of the other forms.

In all of the illustrations previously described, the axes 30, 37 and 33 are in a straight line. Such an arrangement is not compulsory as the portion of the basic lever to the left of axis 37 can be bent permanently and by a fixed angle with respect to the portion to the right.

In the form of Figure 5, the bending of the lever 30—37—33 has been made equal to 180°, and the distance 30—37 equals the distance 37—33, so that the input and output shafts are coaxial as shown, one, of course, being displaced in space behind the other.

It will be evident that the arrangement of the crank pins 31 and 34 in Figure 1 along the sliding lever 36 so that these elements remain aligned with the point or axis 37 can be accomplished by a wide variety of embodiments which will guide a point on a substantially straight path.

The structure of Figure 6 involves a lever 73 pivoted on the point or axis 37, and making pivotal connection also at 37 with a lever 74. Levers 75 are pivotally connected at 76 to the respective ends of the lever 73. These levers 75 and 74 at their opposite ends are respectively pivotally connected to a lever 77, by pivots 78 and 80 (pivot 78 being at the end of lever 77 and pivot 80 toward the opposite end), the opposite end of the levers 77 being respectively pivotally connected to the input crank pin 31 and the output crank pin 34 in the two opposite counterpart lever mechanisms.

In Figure 7, I illustrate an embodiment which simplifies the adjustment. The input shaft 30 drives a crank pin 31, which makes pivotal connection in lever 36. The lever 36 makes sliding pivotal engagement at a point or axis 37 by a slot 60' at the opposite end of the lever 36. The slot 60' also makes sliding pivotal engagement with the output crank pin 34 which in this case is mounted on a lever 61 having a pivot axis 62 which is adjustable to vary the speed reduction ratio as indicated by the arrows. The driven crank pin 34 also makes sliding pivotal engagement in a slot 63 on the output crank 63', which is suitably connected to the output shaft at the axis 33 by a free-wheeling device 48 as in the other forms.

It will be evident that in this form the movement of the adjustment axis 62 changes the position of the driven crank pin and permits adjustment of the entire mechanism. It will be recognized in this form that full equivalence with the previously described forms will be obtainable at both ends of the full range of speed variation, namely at top speed ($m=2.6265$ with $n=1.9569$) and at zero speed. In this form the axis 62 is between the points or axes 37 and 33, although in one limiting position the axis 62 may coincide with the axis 33 and in the other limiting position crank pin 34 may coincide with the point or axis 37, the point or axis 37 being noninterfering with the crank pin 34 so that the two can become coaxial in limiting position.

It will be understood that in this form all four points or axes 30, 37, 62 and 33 are aligned with one another.

Figure 8 illustrates the mechanism of Figure 7 in which slotted bars have been replaced by equivalent known linkages giving substantially straight paths.

Figure 9 shows the mechanism of Figure 7 in which the input shaft 30 and the output shaft 33 have been made co-axial as explained in connection with Figure 5.

Reversibility of rotation of the speed reducer or speed variator according to the invention can be accomplished without recourse to gears or similar reversing mechanisms, provided the free-wheeling devices are made reversible at will. Figure 10 illustrates one of a variety of existing reversible symmetrically built one-way clutches. This mechanism uses a polygonal inner race 81 which in the present invention will suitably be connected to the output shaft. This is surrounded by an outer race 82 which is suitably circular, and interposed between the inner race and the outer race are roller or ball elements 83 which have freedom in between the extremities of their paths but on opposite ends of the paths tend to jam as indicated. The roller or ball elements are resiliently urged toward one or the other limiting position in any suitable manner as by helical compression springs 84 which have outboard abutments at 85 on a ring 86 which is rotatable to opposite limiting positions as shown by the dot-and-dash spring and roller positions, so as to cause the balls or rollers to ride in jamming positions at one end or the other. Ring 86 is interconnected with polygonal inner race 81 and the two turn together, but relative shifting through the small angle suggested by the dot-and-dash position accomplishes reversal of the free-wheeling device.

The reversal may be accomplished manually or automatically by the reaction torque on the casing of the mechanism in a manner well known in dynamometers.

In view of my invention and disclosure variations and modifications to meet individual whim or particular need will doubtless become evident to others skilled in the art, to obtain all or part of the benefits of my invention without copying the structure shown, and I therefore, claim all such insofar as they fall within the reasonable spirit and scope of my claims.

Having thus described my invention, what I claim as new and desire to secure by Letters Patent is:

1. A variable speed mechanical motion-transmitting device for producing from a constant angular input speed a constant angular output speed over at least one-third of a revolution of the input shaft for any setting of the variable speed ratio, comprising an input crank rotatable around a first axis and having a first pin describing a circular motion around said first axis, a first straight lever oscillating around a second point and constantly in pivotal relation with said first pin, an output crank rotatable around a third axis and having a second pin describing a circular motion around said third axis, and a second straight lever pivoted around said second point, said second lever being rigidly attached to said first lever and aligning itself constantly with said second pin, in combination with means for varying at least one parameter of a first class of two parameters and one parameter of a second class of two parameters, the four parameters consisting of:

First Class:
   First parameter—Distance between the first axis and the second point,
   Second parameter—Distance between the first axis and the first pin,
Second Class:
   Third parameter—Distance between the second point and the third axis,
   Fourth parameter—Distance between the third axis and the second pin, said variation over the entire range of speed ratios of the device satisfying substantially the equation:

$$\frac{n-1}{m+1} = \frac{\cos c + \sqrt{3} \sin c}{2 \cos (b+c)} \sqrt{\frac{n^2+1-2n \cos b}{m^2+m+1}}$$

in which $m$ is the ratio of the first parameter to the second parameter, $n$ is the ratio of the third parameter to the fourth parameter, $c$ is an angle defined by $$\tan c = \frac{\sqrt{3}}{2m+1}$$

and $b$ is an angle defined by $$\sin (b+c) = n \sin c$$

2. A mechanical motion-transmitting device of claim 1, in combination with a separate articulated control lever arrangement for obtaining selection of the speed ratios by relative proper positioning of the first axis, the second point and the third axis of said device, always aligned on a straight line, the arrangement comprising a first arm rotatable around a fixed pivot and connected to the first axis, a second arm rotatable around a fixed pivot and connected to the second point, a third arm rotatable around a fixed pivot and connected by a common joint to two rods, one of the rods connecting to the first axis and the second rod connecting to the second point, with the relative positions of the fixed pivots and dimensions of arms and rods in terms of cartesian coordinates and lengths, respectively, being 0—0 for the third axis, 131—102 for the pivot of the first arm, 55—76 for the pivot of the second arm, 79—41.5 for the pivot of the third arm, 102 for the length of the first arm, 76 for the length of the second arm, 79 for the length of the third arm and 53 for the length of each rod, these coordinates and lengths being expressed in any common unit of length, whereby the relationship of the parts substantially imposes the conditions required by the equation.

3. A mechanical motion-transmitting device of claim 1, in which the first axis and the third axis are coaxial.

4. A variable speed mechanical motion-transmitting device for producing from a constant angular input speed a constant angular output speed over at least one-third of a revolution of the input shaft for any setting of the variable speed ratio, comprising an input crank rotatable around a first axis and having a first pin describing a circular motion around said first axis, a first straight lever oscillating around a second point and constantly in pivotal relation with said first pin, an intermediate crank rotatable around a third axis and having a second pin describing a circular motion around said third axis, a second straight lever pivoted around said second point, said second lever being rigidly attached to said first lever and aligning itself constantly with said second pin, and an output straight lever oscillating around a fourth axis and aligning itself constantly with said second pin, with the condition that the second point, the third axis, the fourth axis and the second pin be on a straight line when the first axis, the second point and the first pin are on a straight line, in combination with means to vary at least one parameter of a first class of two parameters and one parameter of a second class of two parameters, the four parameters consisting of:

First Class:
    First parameter—Distance between the first axis and the second point,
    Second parameter—Distance between the first axis and the first pin, Second Class:
    Third parameter—Distance between the second point and the third axis,
    Fourth parameter—Distance between the third axis and the second pin, said variation over the entire range of speed ratios of the device satisfying substantially the following equation:

$$\frac{n-1}{m+1} = \frac{\cos c + \sqrt{3} \sin c}{2 \cos (b+c)} \sqrt{\frac{n^2+1-2n \cos b}{m^2+m+1}}$$

in which $m$ is the ratio of the first parameter to the second parameter, $n$ is the ratio of the third parameter to the fourth parameter, $c$ is an angle defined by $$\tan c = \frac{\sqrt{3}}{2m+1}$$

and $b$ is an angle defined by $$\sin (b+c) = n \sin c$$

5. A mechanical motion-transmitting device of claim 4, in which the first axis and the fourth axis are coaxial.

References Cited in the file of this patent
UNITED STATES PATENTS

| Number | Name | Date |
|---|---|---|
| 284,816 | Campen | Sept. 11, 1883 |
| 652,328 | Parkes | June 26, 1900 |
| 1,155,459 | Woodward | Oct. 5, 1915 |
| 1,163,803 | Bickford | Dec. 14, 1915 |
| 1,334,468 | Morgan | Mar. 23, 1920 |
| 1,423,008 | Morton | July 18, 1922 |
| 1,432,853 | Hanson | Oct. 24, 1922 |
| 2,162,124 | Robin et al. | June 13, 1939 |
| 2,175,578 | Stout | Oct. 10, 1939 |
| 2,183,193 | Husson | Dec. 12, 1939 |
| 2,416,739 | Chandler | Mar. 4, 1947 |
| 2,679,167 | Nichinson | May 25, 1954 |
| 2,691,896 | Stegeberg | Oct. 19, 1954 |
| 2,706,914 | Spence | Apr. 26, 1955 |
| 2,708,848 | Hohenner | May 24, 1955 |

FOREIGN PATENTS

| Number | Country | Date |
|---|---|---|
| 326,297 | Great Britain | Mar. 13, 1930 |
| 349,091 | Italy | June 7, 1937 |
| 779,688 | France | Jan. 19, 1935 |
| 844,522 | Germany | July 21, 1952 |

OTHER REFERENCES

Publication: Zero-Max Pamphlet, received in Div. 12, August 1952.